Aug. 16, 1966  B. B. DEARDEN  3,266,599
MULTI-PURPOSE MECHANICAL HANDLING VEHICLE

Filed May 11, 1964  8 Sheets-Sheet 1

INVENTOR
BRIAN BURTON DEARDEN
BY
Shoemaker and Mattare
ATTORNEYS

Aug. 16, 1966     B. B. DEARDEN     3,266,599

MULTI-PURPOSE MECHANICAL HANDLING VEHICLE

Filed May 11, 1964     8 Sheets-Sheet 4

Fig. 4.

INVENTOR
BRIAN BURTON DEARDEN
BY
*Shoemaker and Mattare*
ATTORNEYS

Aug. 16, 1966 B. B. DEARDEN 3,266,599
MULTI-PURPOSE MECHANICAL HANDLING VEHICLE
Filed May 11, 1964 8 Sheets-Sheet 7

INVENTOR
BRIAN BURTON DEARDEN
By Shoemaker and Mattare
Attys.

United States Patent Office 3,266,599
Patented August 16, 1966

3,266,599
MULTI-PURPOSE MECHANICAL HANDLING VEHICLE
Brian B. Dearden, Bramhall, England, assignor to C. H. Johnson (Machinery) Limited, Stockport, England
Filed May 11, 1964, Ser. No. 366,355
5 Claims. (Cl. 187—9)

This invention relates to a vehicle suitable for use for a number of different purposes in civil engineering work, building work, and the like for the mechanical handling of building materials and components and the like. The machine may be used for example after the fashion of a crane, a fork-lift truck, a mechanical digger or shovel, a mechanical loader, a handler of concrete skips and for many other purposes.

One object of the invention is to provide a machine the working parts of which, apart from its propelling means, are operated entirely hydraulically. Such a machine is much easier to operate than is a mechanical winch-type machine and moreover is more in line with the modern tendency to have civil engineering and building plant of an hydraulically-operated kind. It is in fact an object of the invention to provide an almost universally useful vehicle for the handling of materials on a building site or in other civil engineering work.

A vehicle according to the present invention incorporates several inventive and novel features. The improved machine comprises a power-driven chassis having a telescopic jib or "leader" at the front, the upper, telescopically movable part of such jib being adapted to be raised and lowered relatively to the lower part by hydraulic means, there is a roller carriage or trolley mounted for travelling up and down the whole length of such jib also by hydraulic means, this movement of the carriage being possible in all stages of contraction and extension of the telescopic leader, and the lower part of the leader is associated with other hydraulic means whereby the leader may be raked backwards through a substantial angle (40° or thereabouts) from the vertical position or from a point just forwards of the vertical position, whereby with a V-shaped skip or bucket on the said carriage or trolley any load picked up by such skip or bucket will be symmetrically balanced about a vertical plane transversely of the vehicle.

In carrying out this part of the invention the said carriage is connected to one end of a rope or cable the other end of which is anchored to the lower part of the leader and the intermediate part of which runs over a pulley attached to the upper or sliding part of the leader. The lifting and lowering of the carriage therefore is effected by an extension and contraction of the leader and the carriage moves at twice the rate of the sliding part of the leader, these relative speeds obtaining at all rake angles of the leader.

The improved vehicle also incorporates other features, which become apparent from the following description read in the light of the accompanying drawings, in which.

Referring first to FIGS. 1–5 the improved vehicle comprises a chassis indicated generally at 1, fitted with driving wheels 2 on a differential axle 3 at the front and with steerable wheels 4 at the rear. The vehicle has an engine within the canopy 5, both for driving the wheels 2 and for driving a hydraulic pump, there is a bank of hydraulic controls 6 adjacent the driver's seat 7, and a hand lever 8 for braking purposes.

Pivotally mounted to the said chassis 1, at the front end, that is to say forwardly of the front axle 3 is the leader or jib 9 which is composed of a lower part 9a and an upper part 9b. Both these parts are formed of channel members, the channels being open to the centre of the vehicle and those of the upper part sliding in those of the lower part, as can be seen for example in FIG. 4. Rollers may be provided on the lower part of the upper portion 9b of the leader to run in the channels of the lower portion 9a to reduce friction. The respective channels are braced together by suitable cross members 10, giving rigidity to the structure. For tilting the leader 9 about its pivotal connections to the chassis there are hydraulic thrust rams and cylinders 11, the cylinders being pivotally connected to the chassis at 12 and the rams pivotally connected to the leader at 13. These thrusters are operated by one of the controls 6.

Figure 1:
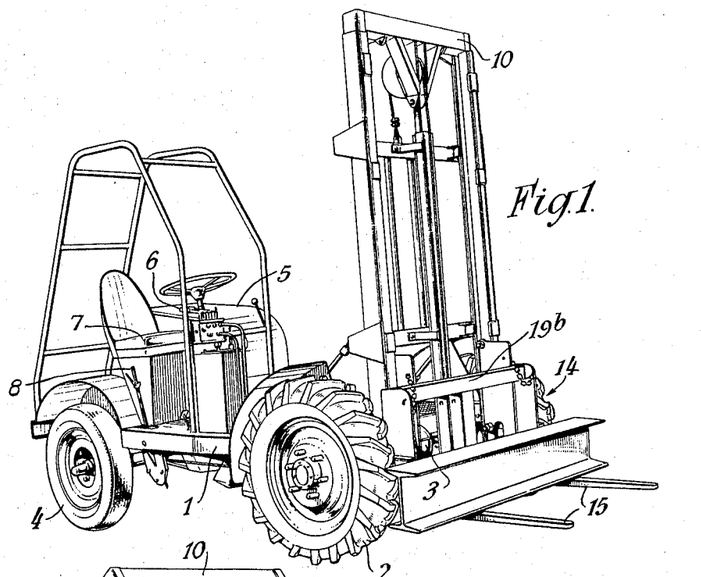
FIG. 1 is a perspective view of the vehicle adapted as a fork-lift vehicle and with the load near its lowermost position.
Figure 2:
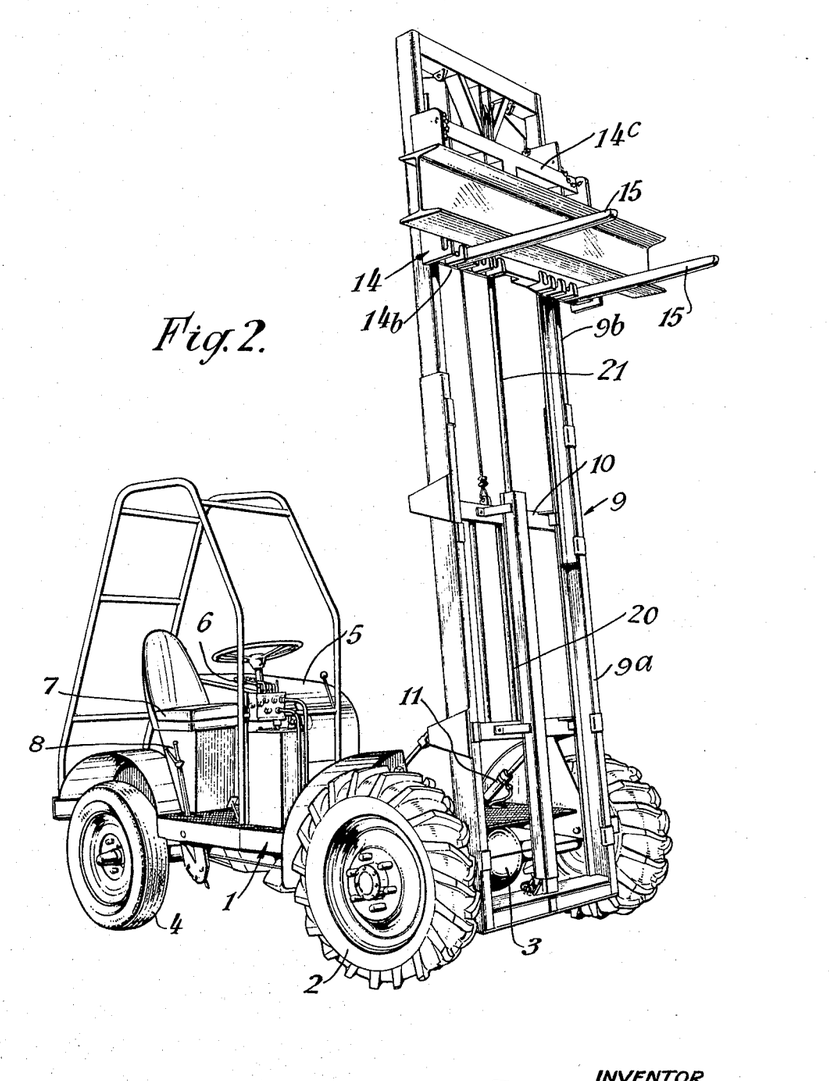
FIG. 2 is a view corresponding to FIG. 1, but with the load near its uppermost position.
Figure 3:
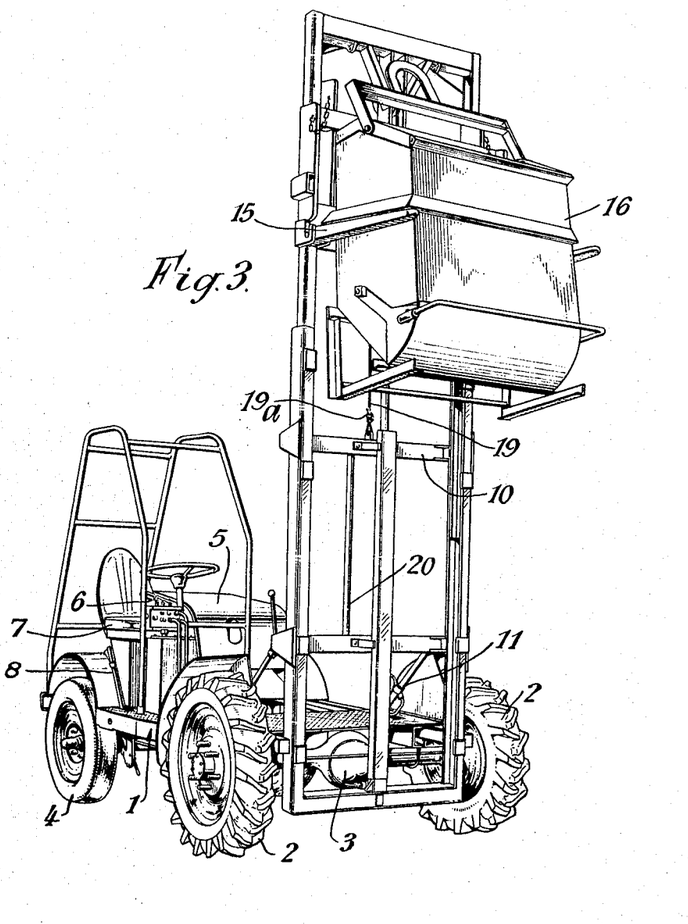
FIG. 3 is a view similar to FIG. 2 but with a concrete skip as the load.
Figure 4:
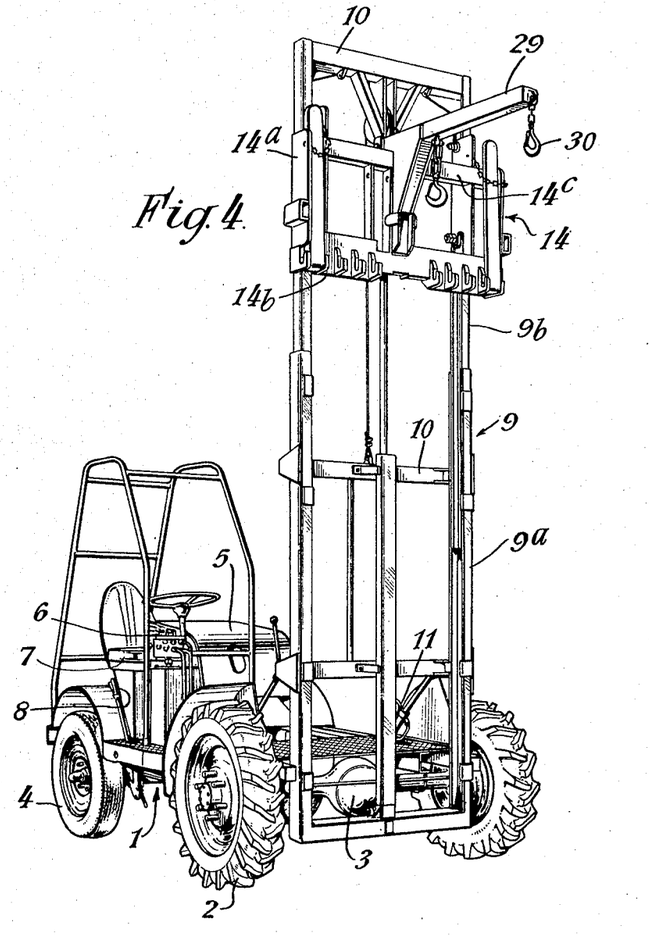
FIG. 4 is a further view similar to FIG. 2 but showing the vehicle adapted as a crane.
Figure 5:
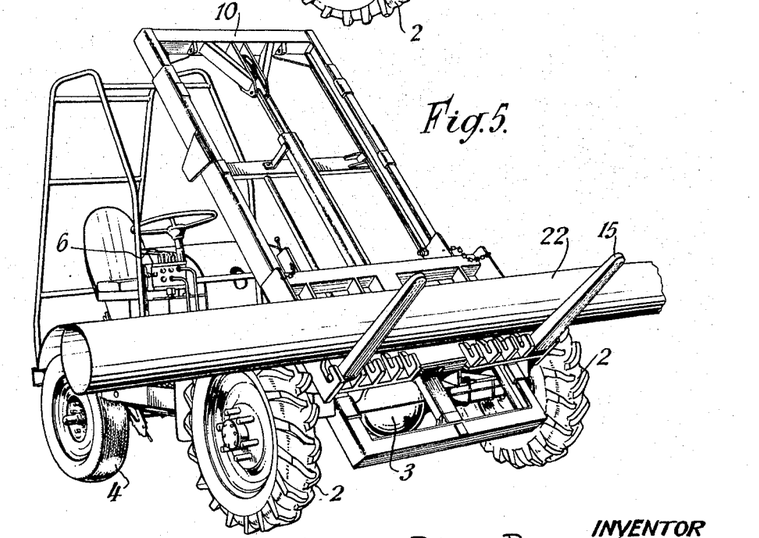
FIG. 5 shows how the vehicle can be used for carrying long loads in a stabilised state.
Figure 6:
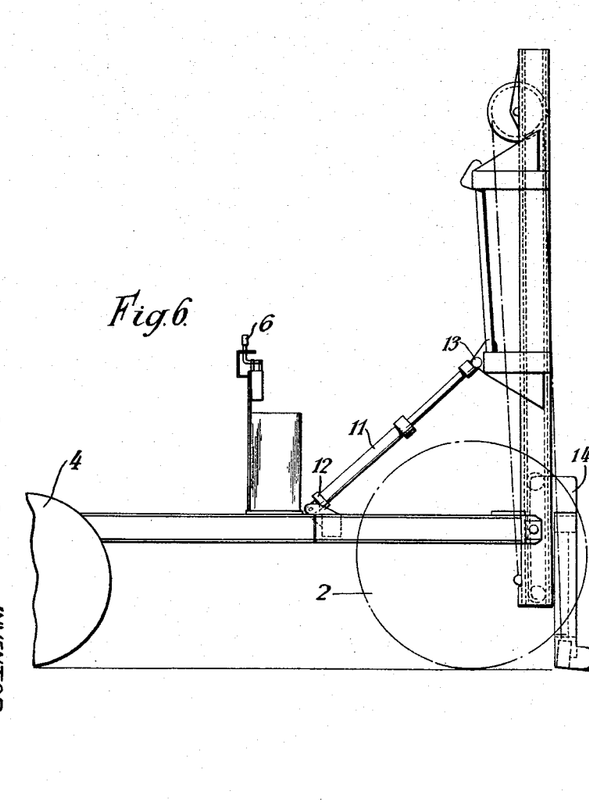
FIG. 6 is a side view of part of the vehicle, showing the lifting mechanism.
Figure 7:
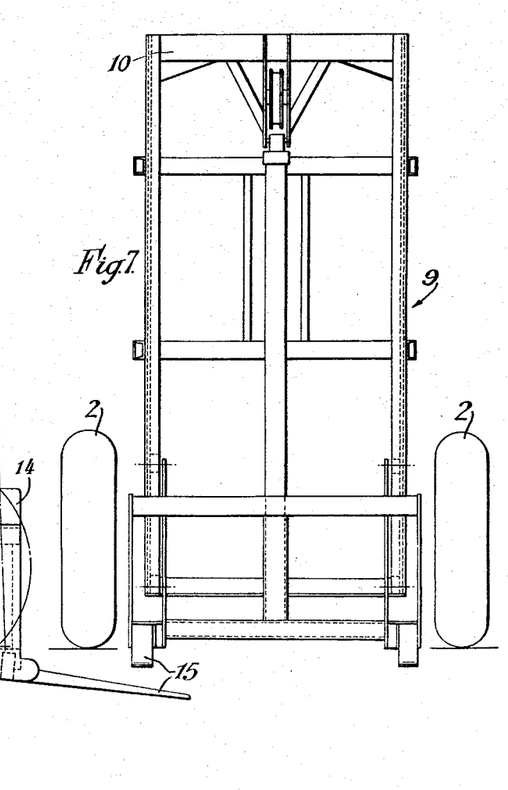
FIG. 7 is a front view of the same.
Figure 8:
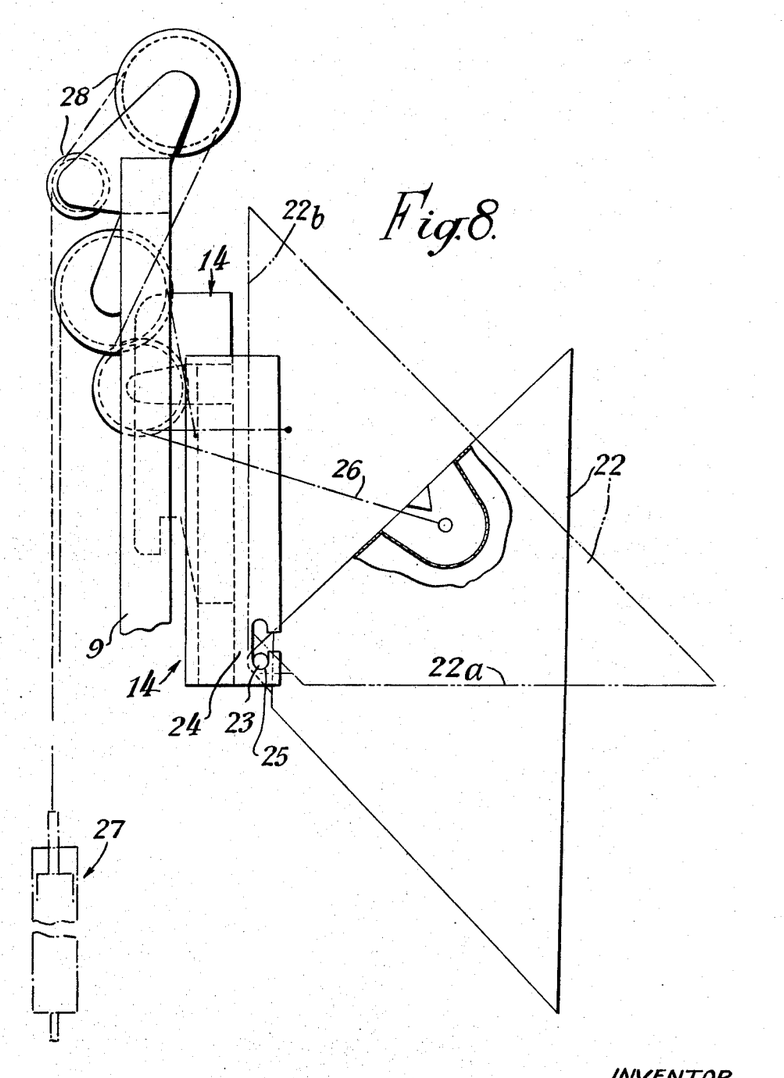
FIG. 8 is a diagrammatic fragmentary view of the skip-tipping arrangements.
Figure 9:
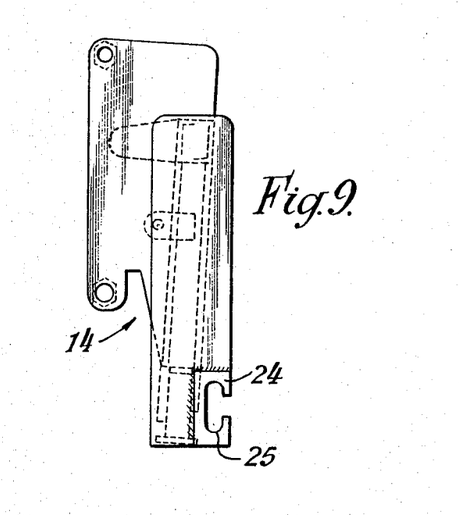
FIG. 9 is a side view of the rising and falling carriage or trolley.
Figure 10:
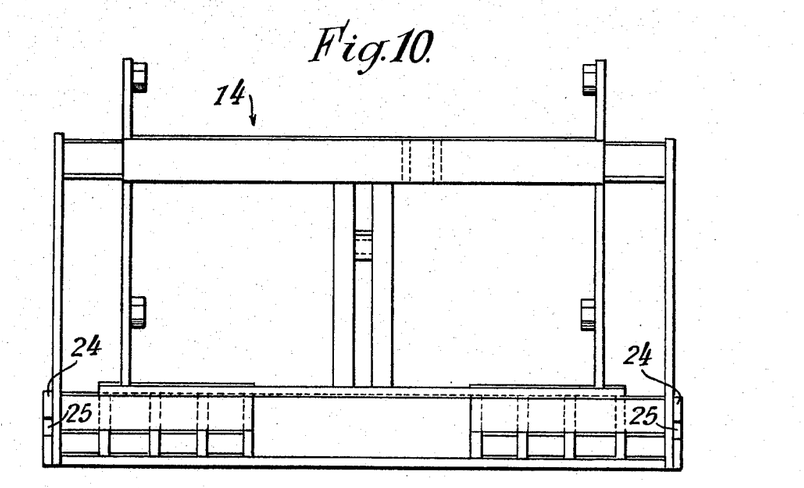
FIG. 10 is a front view of the same.

Slidably mounted on the leader 9 is a carriage or trolley 14 which has side parts 14a, a lower cross member 14b and an upper cross member 14c. The said side parts 14a and also the lower cross member 14c are adapted to receive the ends of prongs 15 for lifting purposes as shown in FIGS. 1, 2 and 5 and these may be inserted into any selected one of a number of openings in the part 14c according to the width of the load to be carried, see FIG. 10. The carriage 14 also has further load-supporting means described below to carry a concrete skip 16 as shown in FIG. 3 or a bucket-type skip 17 as shown in FIG. 8.

At the top of the upper part 9b of the leader 9 is a freely-mounted pulley 18 over which passes a length of cable 19 one end 19a of which is fastened permanently to a fixed part of the lower portion 9a of the leader as shown in FIG. 2 and the other end 19b of which is fastened to the rear of the said carriage or trolley 14 as shown in FIG. 1.

For the lifting and lowering of the top part 9b of the leader there is an elongated hydraulic cylinder 20 and ram 21 carried by the lower part 9a. In view of the fixture of the two ends of said cable 19 it will be appreciated that as the top part 9b of the leader is moved upwardly, taking the carriage 14 with it, the carriage will move upwardly at twice the rate at which the top part of the leader moves. This hydraulic system 20, 21 is operated by another of the controls 6.

The normal position of the leader 9 is raked backwardly from the vertical at an angle of about 3°, which is its maximum forward position. It may be raked backwards within a wide range of movement, as is shown in FIG. 5 where the inserted arms or prongs 15 are used to carry an elongated load, in this case a pipe section 22. By allowing the load 22 to rest on the leader as well as on its supports 15 the load becomes stabilised whilst the vehicle is being moved from place to place, even over the rough ground of a building site. The carriage 14 may be traversed up and down the leader whether the leader is raked backwardly or not.

Referring now to FIG. 8 a V-bottomed bucket or skip 22 is provided for detachable connection to the said carriage 14 so shaped that, with the mast or leader 9 in the vertical or substantially vertical position one wall 22a of said skip is horizontal and the skip may operate as a skid-bucket, slidable over the ground for driving into a dump of loose material such as gravel, sand or the like and, by then raking the mast 9 backwards, the lower end of the mast with the shovel has a forward movement into the dump. As the pivot point of the mast is relatively high an additional shovelling or picking-up effect is thus produced and an additional crowding or packing action results, which increases the amount of material picked up by the skip. Also, because of the substantial backward rake of the leader the V-shaped bucket occupies a position symmetrical about a transverse vertical plane passing through the pivot of the skip where the loose material in the skip is safe from spilling.

The skip is so shaped that, in this position, with the mast raked backwardly to its limit, the skip lies as an open-topped V-bucket and may be transported in that position to any other site with the picked-up material adequately contained. Also the skip may be traversed up and down the mast by the said carriage whilst in such open-topped disposition.

In carrying out this part of the invention the skip 22 is provided at each side with a laterally-extending pivot or pin or stud 23 and there are provided on the said carriage 14 a pair of open-fronted slotted plates 24 into which those pivot studs 23 may be entered from the front. The weight of the skip then causes the studs 23 to fall to the bottom of the slots 25 (FIG. 8) where they hold the skip captive to the carriage, but pivotable thereon, until they are lifted out of said slots again. When the mast 9 is raked backwardly, the rear wall 22b of the skip lies firmly on the carriage 14 in a stable condition and the skip may be moved up and down the mast by correspondingly moving the carriage.

This arrangement of skip may be charaterised by means for tipping the skip independently of the means for lifting and lowering it on the mast. Thereby the skip may be raised to any suitable position and tipped, quickly or slowly as may be desired; also it is possible where necessary to combine the lifting and lowering and tipping actions, according to the intended disposition of the tipped-out material.

In carrying out this last-named part of the invention the tipping of the skip is effected by means of a rope or cable 26 attached at one end to a hydraulic means mounted on the lower (non-sliding) part of the mast, and indicated diagrammatically at 27, the cable being led over sheaves 28 at the top of the mast and attached at its other end to the bucket or skip 22. The point of attachment to the skip is substantially at the centre of the mastward wall 22b of the skip and such wall is formed with a pocket or recess to accommodate the cable connection.

By this means, the roller carriage or trolley 14 can be run up and down the mast or leader 9 with the shovel or skip 22 in a constant angular position. When tipping or back tipping of the skip is required, this is obtained by actuating the said hydraulic means 27 which, by the lengthening or shortening of the cable loop 26 going to the skip allows the skip to tip or brings it back from the tipped position as the case may be. Usually such hydraulic means 27 will comprise a cylinder removably attachable at one end to the rear of the carriage, and a ram whose free end is connected as a pulling means to the cable 26 going to the skip.

The invention may also include the provision of a so-called cathead or canti-lever fitting 29 attachable to the carriage 14 being hooked over the top cross bar of the carriage. Alternatively the fitting 29 could be attached to the top cross bar of the mast. The fitting 29 carries two hooks 30 at different points in its length and offering the motions of a crane but without a free rope.

The construction according to this invention has the advantage that the rope or cable 19 normally used for traversing the roller carriage up and down the mast 9 may be detached from such carriage and may be used as a free hook for attachment to a load so that, for example, a load may be dragged on to forks or a platform connected to the said carriage 14 and the cable may even be left attached to the load to assist in stabilising it whilst the load is being transported.

Pivotally mounted fork arms may be provided on the carriage 14 with means for latching them in a folded-up position when not required for use.

Figure 11:
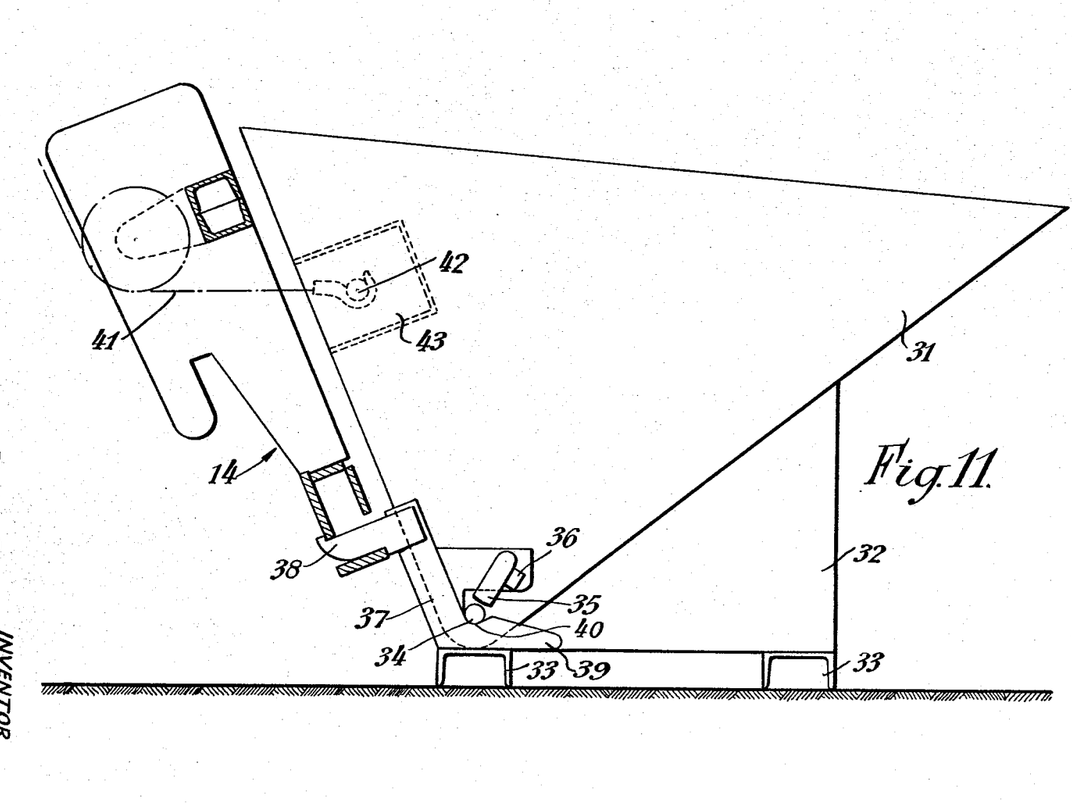
FIG. 11 is a diagrammatic side view of one arrangement for handling a concrete skip.

FIGURE 11 shows an adaptation of the invention to the handling and transport of free-standing tipping skips for concrete and so on. In this case the skip shovel and the fork arms shown in the earlier figures, are discarded. As shown in the figure the open-topped V-shaped skip 31 has at its end extensions 32 placed together by channel members 33 and these form supports so that the skip will stand erect on the ground, free from a crane or machine. At each end of the skip there is a pivot pin 34 and for each of these is associated a pivoted latch 35 which top member 36 limits the fall of the latch under its own weight.

Secured to a trolley or carriage or the mast are self-engaging pivot-and-catch brackets 37 having parts 38 which enter into some of the slots in the said bracket and having on the front lower end forwardly projecting cam tongues 39. When the vehicle is driven up to one of the free-standing skips the cam tongues 39 enter below a pivot pin 34 and the pin rides up the cam tongue and falls into the recess 40. The driver then secures the lower end of the rope 41 to the pin 42 which is housed in a pocket construction at the centre of the back of a skip. By pulling on the said rope 41 the skip is retained in its open-topped position and by raising of the carriage 14 on the mast the skip is lifted off the ground and may be carried about at any height on the mast.

By releasing the stress on the said rope 41 the skip, due to its weight in relation to the pivot pins 35 tips forwardly and discharges its contents into the vehicle or shuttering or any other place required. The skip may be taken away to any place and released from the vehicle by the lifting of the latch members 36 so that they do not retard the withdrawal of the cam tongues 39 below the pivot pins 35, leaving the skip standing freely on the ground.

What I claim is:

1. A multi-purpose mechanical handling vehicle comprising a power-driven chassis, a telescopic jib or "leader" pivotally mounted on the front of the chassis, at least one tilting ram connected between the chassis and the jib whereby the jib may be raked backwards through a substantial angle (40° or thereabouts) from the vertical position or from a point just forwards of the vertical poistion, a raising hydraulic ram connected between the telescoping parts of the jib to raise and lower an upper part on a lower part, a carriage mounted for travelling up and down the whole length of the jib, a skip pivotally attached to the carriage, a length of flexible member having one end fixed to the lower part of the jib and the other end connected to the carriage, the flexible member passing over a pulley on the top of the upper part of the jib whereby as the upper part of the jib is raised, the carriage, and any load carried thereby, is raised on the jib at twice the speed of the upper part, the carriage including a material carrying skip pivotally attached thereto, a second length of flexible member passing over a pulley mounted on the top of the upper part of the jib, one end of the flexible member being attached to the skip, and the lower part of the jib has at its lower end a stationary hydraulic ram to which the other end of the member is attached and which may be extended to virtually extend the length of the member whereby the skip can tip under the gravitational action of its load to discharge its load.

2. A multi-purpose mechanical handling vehicle according to claim 1 in which the skip is detachably connected to the carriage.

3. A multi-purpose mechanical handling vehicle according to claim 2 in which the skip has at each side a laterally-extending pivot pin, and there are provided on the said carriage a pair of open-fronted slotted plates into which those pivot studs may be entered from the front, the weight of the skip then causing the studs to fall to the bottom of the slots where they hold the skip captive to the carriage, but pivotable thereon, until they are lifted out of said slots again.

4. A multi-purpose mechanical handling vehicle according to claim 1 wherein the flexible member is a rope or cable and the roller carriage has a suitable sheave over which the rope passes.

5. A multi-purpose vehicle according to claim 1, in which the skip is an open-topped free-standing skip in which there are on the said carriage self-engaging pivot and catch brackets adapted to be driven under pivot pins on the sides of the skip to be held therein by latch members the skip having an engagement point at its rear face for engagement by a rope by which it may be retained in the erect position, the skip also having supports allowing it to stand freely on the ground.

References Cited by the Examiner

UNITED STATES PATENTS

| 2,319,456 | 5/1943 | Hazen | 214—620 |
|---|---|---|---|
| 2,558,388 | 6/1951 | Richardson | 214—620 |
| 2,569,053 | 9/1951 | Healy | 214—670 |
| 2,701,658 | 2/1955 | Radin | 214—620 |
| 2,764,307 | 9/1956 | Kughler | 214—700 |
| 3,013,684 | 12/1961 | King | 214—620 |
| 3,023,919 | 3/1962 | Hobson | 214—620 |
| 3,032,220 | 5/1962 | Love | 214—620 |
| 3,051,265 | 8/1962 | Boyajian | 187—9 |
| 3,115,261 | 12/1963 | Antolini | 214—620 |

FOREIGN PATENTS

| 1,361,765 | 12/1963 | France. |
|---|---|---|
| 323,207 | 7/1957 | Switzerland. |

OTHER REFERENCES

Standard Attachments for Clark Yardlift 20 Fork Trucks: Clarke Equipment Company, Battle Creek, Michigan, March 9, 1948, 4 pages.

EVON C. BLUNK, *Primary Examiner.*

H. C. HORNSBY, *Assistant Examiner.*